United States Patent [19]

Wilson

[11] Patent Number: 4,564,203
[45] Date of Patent: Jan. 14, 1986

[54] TRANSPORT AID FOR A-FRAME STEPLADDER

[76] Inventor: Ronald E. Wilson, 6218 E. Paradise La., Scottsdale, Ariz. 85254

[21] Appl. No.: 674,238

[22] Filed: Nov. 23, 1984

[51] Int. Cl.⁴ .............................................. B62B 1/18
[52] U.S. Cl. .................................. 280/47.32; 182/127; 182/129; 182/230
[58] Field of Search ............ 280/78, 769, 47.3, 47.32, 280/37, 767, 47.13 R; 180/209, 905, 906; 182/127, 129, 330, 206; 108/27; 190/18 A

[56] References Cited

U.S. PATENT DOCUMENTS

| 368,515 | 8/1887 | Chadeayne | 280/767 |
| 3,154,164 | 10/1964 | Shaw | 180/209 |
| 4,083,427 | 4/1978 | Box | 182/229 |

FOREIGN PATENT DOCUMENTS

| 486418 | 3/1927 | Fed. Rep. of Germany | 280/47.32 |
| 581487 | 11/1976 | Switzerland | 280/47.32 |

OTHER PUBLICATIONS

"Extension Ladder Wheeled to Job with Aid of Dolly", Nash, Nov. 1957.

Primary Examiner—Joseph F. Peters, Jr.
Assistant Examiner—Joseph G. McCarthy
Attorney, Agent, or Firm—Robert A. Hirschfeld; James F. Duffy

[57] ABSTRACT

In aid of a person transporting a narrow oblong object traversing obstacles of various heights, the object is supported at one end by a single wheel disposed adjacent the dihedral intersection of a narrow end and a narrow longitudinal side, the rotational plane of the wheel coinciding with a plane of weight symmetry of the narrow oblong object to reduce tipping tendency when support and propulsion is provided by the person manually at an end opposite the wheeled end. Various means are disclosed for coupling the single wheel to the narrow oblong object, including concave socket and clamp means. Adjustment is provided for coinciding wheel rotational plane with the plane of weight symmetry.

1 Claim, 11 Drawing Figures

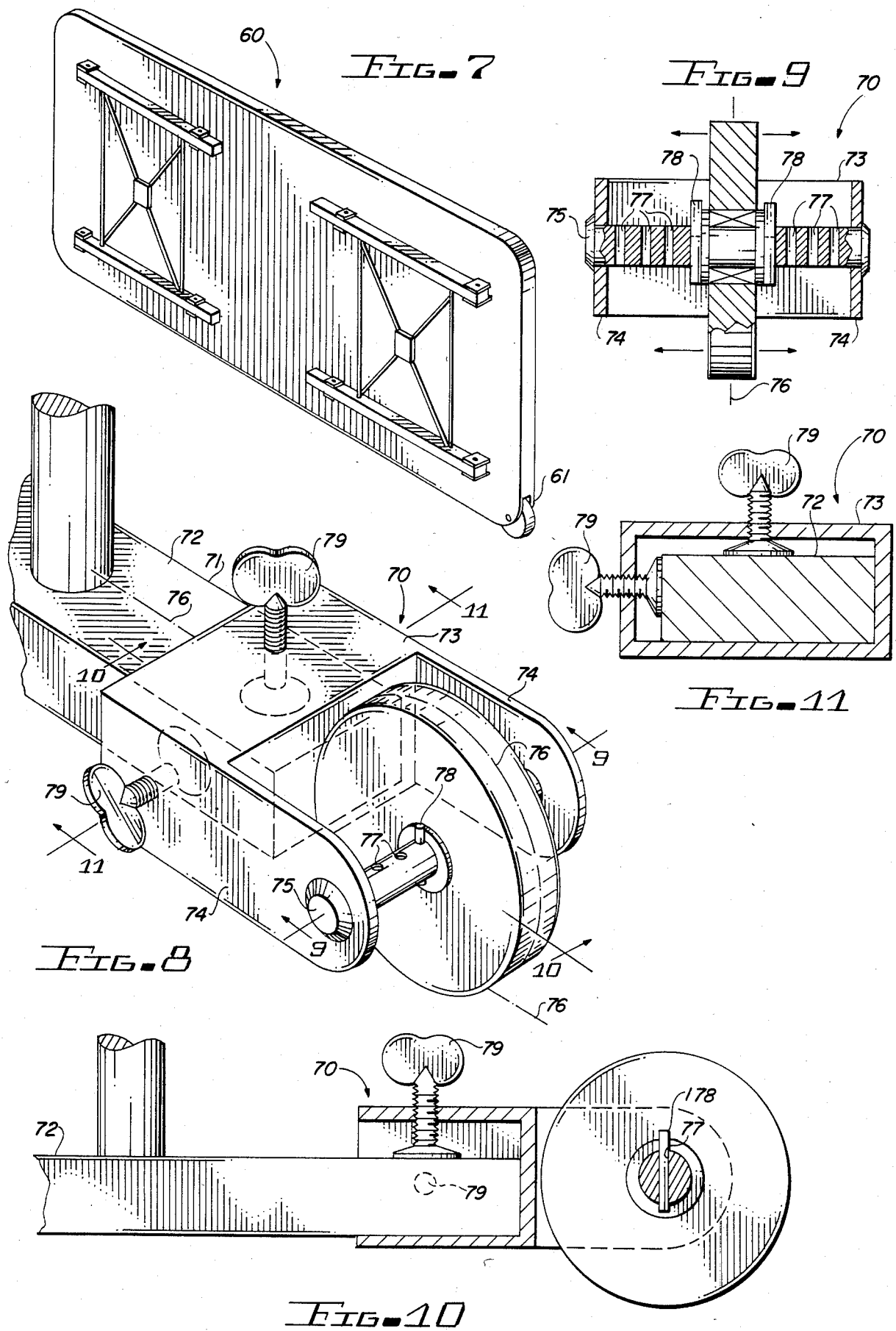

TRANSPORT AID FOR A-FRAME STEPLADDER

BACKGROUND OF THE INVENTION

1. Technical Field

The invention relates to the transport of cumbersome narrow oblong objects.

In particular, the invention relates to a transport aid for an A-frame type stepladder wherein the stepladder rolls upon a single wheel disposed adjacent one end, while being partially supported and propelled by a person holding a second end, with a narrow profile presented to facilitate passage through doors and around corners.

2. Prior Art

Narrow oblong objects, such as ladders, are often too heavy or cumbersome for convenient transport by clerks, warehouse personnel and home residents from one location in a store, warehouse, factory or residence to another without enlisting the assistance of a second person, especially when obstacles such as doors, corners and narrow passageways must be traversed.

Typical prior-art transport aids such as taught by Bjerkgard, U.S. Pat. No. 4,009,762 and by Brookes, et al., U.S. Pat. No. 4,049,283, dispose the narrow oblong object upon a plurality of wheels, with substantially horizontally disposed broad longitudinal surface presenting a relatively wide profile unsuitable for traversing doors, corners and narrow passageways. While the use of a plurality of wheels on a wide wheel-base resists tipping over during transport, such resistance is undesirable in many practical situations where tipping is necessary to traverse a combination of obstacles laterally displaced at various loci above the floor. The wheel means of prior art were cumbersome, either requiring detachment in order to place the narrow oblong object into use, or interfering substantially with said use.

The principle of the wheelbarrow is well known prior art, wherein a single wheel supports one end of the wheelbarrow, and handles with wide lateral displacement are provided at a second end for manual propulsion and to transmit manually applied torque to keep the wheelbarrow upright. The traditional wheelbarrow's horizontally separated propulsion handles necessarily produce obstacle interference problems similar to those described for the Bjerkgard and Brookes, et al. patents above. Further, the traditional wheelbarrow configuration has a relatively low center of gravity, wherein offset between the single wheel and a vertical plane of weight symmetry is less troublesome than when a narrow oblong object necessarily must be tipped so as to raise its center of gravity high above its lowest point in traversing obstacles. The wheelbarrow's horizontally separated handles distribute weight approximately equally between the user's hands, and application of simultaneous anti-tipping torque between those hands is relatively comfortable. Conversely, when a person attempts to propel one end of a narrow oblong object past an obstacle by grasping a lower edge with one hand, and an upper edge, separated by a substantial vertical distance from the lower edge, with the other hand, ability to exert anti-tipping torque between such handholds is reduced because the lower hand supports substantially all of the distributed weight. Any inherent imbalance tending to create a tipping moment in the hand-over-hand position is therefore undesirable.

Therefore, it is an object of the invention to provide a transport aid by which a person may propel a narrow oblong object traversing obstacles without the aid of another person.

Another object of the invention is to provide an aid for transport of a narrow oblong object wherein a narrow profile is presented to facilitate traversing obstacles.

A further object of the invention is to provide an aid for transport of a narrow oblong object wherein the need for the user to exert anti-tipping torque is minimized.

Still another object of the invention is to provide an aid for transport of a narrow oblong object capable of user-controlled angular disposition during transport to avoid combinations of obstacles at various loci above the floor.

A still further object of the invention is to provide an aid for transport of a narrow oblong object which does not substantially interfere with the utility of the object.

Another object of the invention is to specifically provide an aid for transporting a ladder by a person without the aid of another person.

Yet another object of the invention is to provide an aid for transport of a narrow oblong object easily attached and detached from the object, and transferable from one narrow oblong object to another.

A further object of the invention is to provide adjustable compensation for variations in a plane of weight symmetry of one transported object as compared to another transported object.

DISCLOSURE OF THE INVENTION

A narrow oblong object such as a ladder, defined as bounded by a parallelepiped having broad opposing longitudinal faces and narrow opposing longitudinal sides communicating between narrow ends, is transported in wheelbarrow fashion substantially in its longitudinal direction, but with its broad longitudinal faces substantially upright, presenting a narrow profile. A single wheel coupled to the object adjacent a dihedral intersection of a first end and one of the narrow longitudinal sides supports the object at the first end in cooperation with a person hand-holding and propelling the object at an opposing second end. The plane of rotation of the single wheel is coplanar with a plane of weight symmetry of the object, defined substantially parallel the broad longitudinal faces, minimizing thereby the object's tipping tendency.

In one embodiment of the invention, the single wheel and an axle upon which the wheel rotates are coupled to a forked end of a side rail of a straight ladder, wherein the single wheel is protrudingly disposed within the forked end.

In another embodiment of the invention, the single wheel is similarly disposed within a forked end portion of an extension latter, the plane of weight symmetry defined with the extension ladder unextended.

In another embodiment of the invention, the apical top step of an A-frame type stepladder is forked, and adjacent legs of the stepladder have cooperating notches forming with the forked portion of the top step a cavity, within which the single wheel is protrudingly disposed.

The single wheel in another embodiment of the invention is protrudingly disposed within a recess in a narrow oblong object, such as a heavy conference table top.

In each of the embodiments, the single wheel rotates upon an axle, the axle being coupled to the narrow oblong object adjacent a dihedral intersection of a first end and one of the narrow longitudinal sides of the parallelepiped bounding the object.

In a further improvement, the single wheel and its axle are releasably coupled to the narrow oblong object by at least one of a clamp and a concave socket, to permit transfer of the invention from one narrow oblong object to another. To compensate for variations in locus of the plane of weight symmetry of one object as compared to another object, the locus of single wheel rotation plane is adjustable.

BRIEF DESCRIPTION OF THE DRAWINGS

FIG. 7 is a perspective view of a folding-leg table embodying the present invention.

FIGS. 8, 9, 10 and 11 are perspective and sectional plan views of an embodiment of the present invention releasably coupled to the side rail of a straight ladder, showing clamping means for adjusting the plane of wheel rotation in relation to a plane of weight symmetry of the ladder.

BEST MODE FOR CARRYING OUT THE INVENTION

Figure 2:
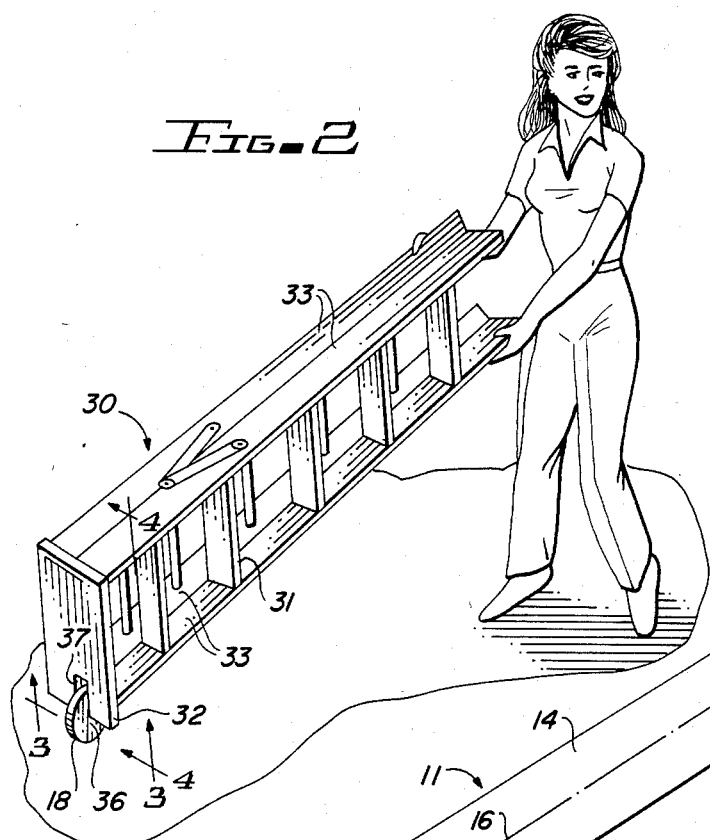
FIG. 2 is a perspective view of a collapsed A-frame type stepladder embodying the present invention.
Figure 3:
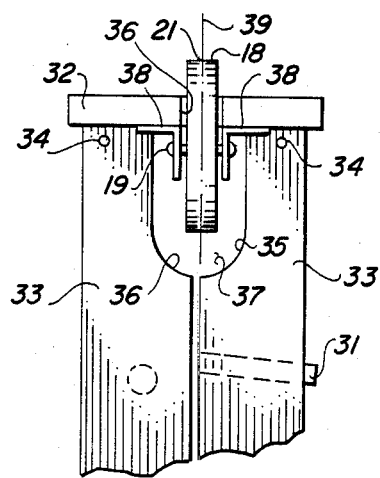
FIGS. 3 and 4 are narrow side and broad face views along lines 3—3 and 4—4 of FIG. 2 respectively.

For the purpose of promoting an understanding of the principles of the invention, reference will now be made to the embodiments illustrated in the drawings. Specific language will be used to describe the same. It will, nevertheless, be understood that no limitation of the scope of the invention is thereby intended, such alterations and further modifications in the illustrated device; and such further applications of the principles of the invention as illustrated herein being contemplated as would normally occur to one skilled in the art to which the invention relates.

Figure 1:
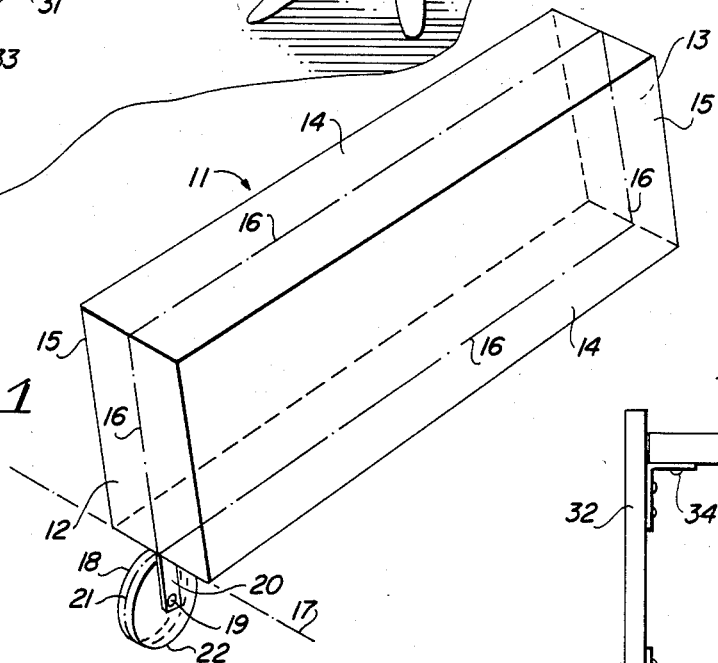
FIG. 1 is a perspective view of a generalized parallelepiped bounding a narrow oblong object transported upon an embodiment of the present invention.
Figure 4:
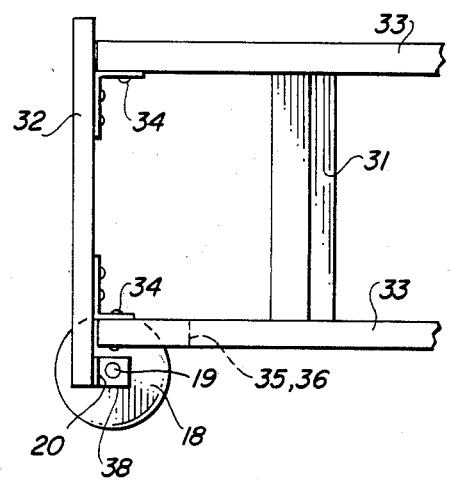

FIG. 1 illustrates in perspective view a generalized parallelepiped 11 bounding a narrow oblong object (not shown in FIG. 1, various embodiments of said narrow oblong object illustrated in FIGS. 2 through 11), having first narrow end 12, opposing second narrow end 13, opposing narrow longitudinal sides 14, opposing broad longitudinal faces 15, and a plane of weight symmetry indicated by said plane's intersection 16 with sides 14 and ends 12,13. First narrow end 12 intersects one of narrow longitudinal sides 14 at dihedral intersection 17, adjacent which single wheel means 18 having axle means 19 is coupled by coupling means 20 to the narrow oblong object bounded by parallelepiped 11. Plane of rotation 21 having floor tangency point 22 is medially defined through single wheel means 18. Plane of rotation 21 is coplanar to plane of weight symmetry indicated by intersection 16. Thus, it may be seen that no matter to what elevation second narrow end 13 is raised in traversing obstacles during transport, the narrow oblong object bounded by parallelepiped 11 is balanced if opposing broad longitudinal faces 15 are substantially upright.

FIG. 2 illustrates an A-frame type stepladder 30 in collapsed condition having steps 31 parallel apical top step 32 corresponding to first narrow end 12 of FIG. 1. As more clearly visible in FIGS. 3 and 4, legs 33 pivoted by pivots 34 from apical top step 32 have respective cooperating notch means 35 adjacent forked end 36 of apical top step 32, thereby forming recess 37 within which single wheel means 18 is rotatingly protrudingly disposed upon axle means 19. Coupling means 20 comprises axle mounting means 38 straddling recess 37 and fixing single wheel means 18 at a locus where plane of rotation 21 is coplanar to plane of weight symmetry 39 of stepladder 30.

Figure 5:
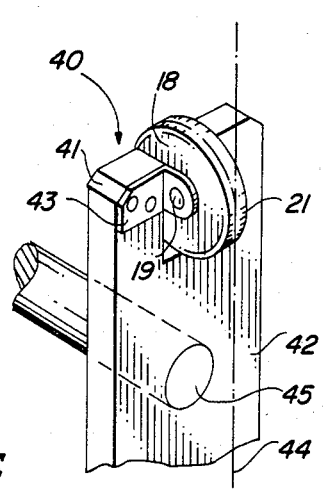
FIG. 5 is a perspective view of the end of a forked side rail of a straight ladder embodying the present invention.

In FIG. 5, forked end means 41 of rail 42 of a straight ladder 40 embodying the present invention is shown with single wheel means 18 rotatingly protrudingly disposed within forked end means 41, upon axle means 19, which is mounted by axle mounting means 43, fixing single wheel means 18 at a locus where plane of rotation 21 is coplanar to plane of weight symmetry 44 of straight ladder 40.

Figure 6:
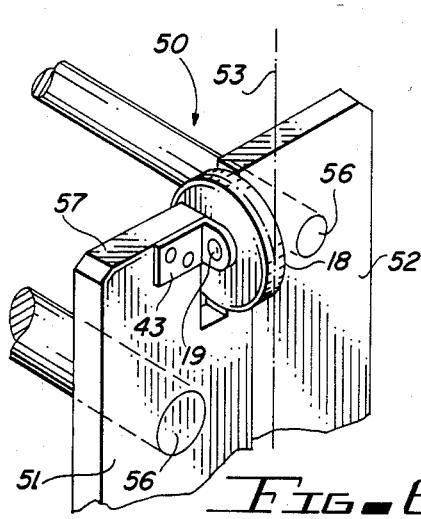
FIG. 6 is a perspective view of the ends of coacting sections of an extension ladder embodying the present invention.

FIG. 6 illustrates the present invention embodied in an extension ladder 50, having slidingly coupled rails 51, 52, wherein rail 51 has a forked end means 57 offset in comparison to the relatively centered forked end means 41 of the straight ladder 40 of FIG. 5 to account for the offset plane of weight symmetry 53 of extension ladder 50, which is intermediate rungs 56, as compared to straight ladder 40's plane of weight symmetry 44 passing through rungs 45 in FIG. 5.

In the embodiment shown in FIG. 7, a folding-leg conference table 60 has recess means 61 adjacent a corner 63 of table 60 corresponding to the dihedral intersection 17 of FIG. 1, within which single wheel means 18 is rotatingly protrudingly disposed upon axle means 19, which is coupled directly to table 60 by coaction with coupling holes 62.

FIGS. 8, 9, 10, 11 show a releasable embodiment 70 of the present invention, suitable for coaction with protruding end means 71 of a narrow oblong object bounded within a parallelepiped 11, shown in FIG. 8 as an ordinary straight ladder 72. Concave socket means 73 abuts a portion of protruding end means 71, but is shown as having interior dimensions somewhat larger than the dimensions of protruding end means 71 in order to show that said end means 71 may have a range of size and cross-section, yet be securely held by setscrew releasable clamp means 79. Concave socket means 73 is coupled by straddling coupling means 74 to axle means 75, which has means for adjusting the plane of rotation 21 of single wheel means 18 with respect to the actual locus of the plane of weight symmetry 76 of ladder 72, said means comprising a plurality of holes 77 through axle means 75, coactive with pins 78, location of which is selectable by the user. In addition to aiding transport of narrow oblong objects, the embodiment of FIG. 8 may also be used for convenient transport of long pieces of lumber (not shown) having cross-section equal to or less than the inner cross-sectional dimensions of concave socket means 73, steel beams, pipes, and the like.

What has been disclosed is an aid for transport of narrow oblong objects, wherein a single wheel is disposed adjacent the dihedral intersection of a narrow end and a narrow longitudinal side, the rotational plane of the wheel coinciding with a plane of weight symmetry to permit easy wheelbarrow-fashion transport by a person propelling and supporting an end opposite the end at which the wheel is disposed. Embodiments have been shown for an A-frame type stepladder, a straight ladder, an extension ladder and a heavy conference table; however the principle disclosed is applicable to any narrow oblong object. Embodiments have been shown in which the single wheel is partially enclosed within and permanently affixed to each of the illustrated structures, and also in which the present invention may be releasably employed with any suitably shaped narrow oblong object.

Those skilled in the art will readily derive other embodiments of the invention drawn from the teachings herein. To the extent that such alternative embodiments are so drawn, it is intended that they shall fall within the ambit of protection provided by the claims appended hereto.

Having described my invention in the foregoing specification and the accompanying drawings in such a clear and concise manner that those skilled in the art may readily understand and easily practice the invention, that which I claim is:

1. A transport aid for a narrow oblong object, said object bounded by a parallelepiped having a narrow first end longitudinally opposite a narrow second end, between which ends communicates opposing narrow longitudinal sides and opposing broad longitudinal faces, a plane of weight symmetry parallel said opposing broad longitudinal faces, said transport aid comprising:

single wheel means having medially defined a plane of rotation for balancingly supporting said first end in coaction with manual support and propulsion of said second end; and coupling means having axle means coaxial said single wheel means, said axle means orthogonal said plane of weight symmetry, said coupling means coupled to said narrow oblong object adjacent a dihedral intersection of said narrow first end and one of said narrow longitudinal sides, said medially defined plane of rotation coplanar said plane of weight symmetry, wherein said object comprises a collapsible A-frame type stepladder having in collapsed condition steps parallel said narrow first end communicating between legs adjacent said narrow longitudinal sides, an apical top step adjacent said narrow first end, said apical top step having a forked end adjacent a dihedral intersection of said narrow first end and one of said narrow longitudinal sides, a pair of said legs having cooperating notch means adjacent said forked end, said coupling means comprising axle mounting means straddlingly mounting said axle means adjacent said forked end of said apical top step, said single wheel means protrudingly disposed within a recess, said recess comprising said forked end and said cooperating notch means.

* * * * *